United States Patent Office 3,183,200
Patented May 11, 1965

3,183,200
PREPARATION OF LIQUID UREA-FORMALDE-
HYDE CONDENSATES AND CONDENSATES
SO PRODUCED
William B. Hewson, Wilmington, Del., assignor to
Hercules Powder Company, Wilmington, Del., a corporation of Delaware
No Drawing. Filed Apr. 27, 1961, Ser. No. 105,862
11 Claims. (Cl. 260—29.4)

This invention relates to a process for the preparation of liquid urea-formaldehyde condensates characterized by a urea to formaldehyde mole ratio greater than 1, under critical reactant pH and temperature conditions to provide product of markedly high stability and high solids content. In another aspect this invention relates to a process for the preparation of liquid urea-formaldehyde compositions containing urea in a mole ratio to formaldehyde greater than 1 and characterized by high solids content and high stability by reacting a liquid formaldehyde-polymethylol urea condensate with additional urea under a combination of high temperature and high pH conditions. In still another aspect this invention relates to stable high solids-containing urea-formaldehyde condensates so produced.

Various liquid urea-formaldehyde condensates containing formaldehyde in a mole ratio greater than 1 have been utilized in the art as basic reactants for further conversion. For example, urea-formaldehyde condensates (F:U >1) comprising formaldehyde and polymethylol urea function as chemical equivalents of formaldehyde and urea and are readily reactable under acid conditions to form resins. These "high formaldehyde" condensates are stable over prolonged periods and serve as basic reactants in resin-forming reactions even after extended storage periods.

On the other hand, relatively low formaldehyde (or high urea) liquid urea-formaldehyde condensates (F:U <1) which also contain polymethylol urea and contain urea and formaldehyde in further reactable form have been particularly advantageously utilized as reactants for further conversion to urea-formaldehyde type fertilizers which contain nitrogen agronomically available for plant use, this type of fertilizer being described by Clark, "Crops and Soils," vol. 4, No. 8 (1952). These low-formaldehyde condensates can also, when desired, be reacted with additional formaldehyde to produce resin-forming solutions of the kind above described.

Although the high-formaldehyde content resin-forming solutions, i.e., F:U >1, have exhibited stability over prolonged periods, the low-formaldehyde type concentrates, i.e., F:U <1, have been characterized by low stability as manifested by precipitation, or settling, of insolubles within relatively short periods subsequent to their formation. It has, therefore, been necessary to use these low-formaldehyde condensates, substantially immediately following their formation so that their utility has consequently been seriously limited.

Further, both the low-formaldehyde and the high-formaldehyde liquids have been formed by reaction utilizing aqueous formaldehyde as the formaldehyde reactant, the latter containing from 30 to 50 percent formaldehyde. This has necessitated handling of undesirably large volumes of reactants and the product has been undesirably high in water content.

This invention is concerned with the preparation of urea-formaldehyde condensates, containing urea in a mole ratio to formaldehyde greater than 1 under reactant and process conditions providing liquid product characterized by stability over prolonged periods and by a solids content higher than has been possible heretofore. The invention is further concerned with the urea-formaldeyhde condensate product so produced.

In accordance with the invention, a process is provided for the preparation of stable liquid high solids-containing urea-formaldehyde condensates containing urea in a mole ratio to formaldehyde greater than 1, which comprises admixing a liquid formaldehyde polymethylol urea containing formaldehyde in a mole ratio to urea greater than 1 and characterized by a solids content of at least 65 percent, and generally up to about 90 percent, with urea in an amount to provide urea, in the resulting admixture, in a mole ratio to formaldehyde greater than 1, and maintaining the said admixture while containing at least an initial portion of the said urea at a temperature within the range of from 90 to 110° C. and at a pH of from 10.4 to 12 for a period sufficient to form said condensate, generally from a few seconds to as high as 1 hour or longer, as desired, and recovering resulting reaction mixture as product of the process. Further, in accordance with the invention, a urea-formaldehyde condensate produced in accordance with the above described process is also provided.

Liquid formaldehyde polymethylol ureas (F:U >1) utilized as a reactant in the practice of the invention are well known, as set forth hereinabove, and can be prepared in accordance with any suitable procedure. One such procedure is that disclosed in U.S. 2,652,377 in accordance with which urea as a solid, or as an aqueous solution is added to a 30 to 50 percent aqueous formaldehyde solution and dispersed therein in a mole ratio of formaldehyde to urea in the range of about 4.4:1 to 7.3:1, the resulting reaction mixture being maintained at all times at a temperature below 60° C. The pH of the reaction mixture is maintained in the order of 8.8 to 9.5. The resulting alkaline reaction mixture is then heated for a period of at least 15 to 30 minutes at a temperature in the range of from 30 to 60° C. subsequent to which water is distilled from the mixture until the liquid residue of the evaporation contains 60 to 90, more often, 80 to 85 percent total solids. Evaporation of the water can be carried out in any suitable manner but is most advantageously conducted in accordance with a film or "flash" evaporation procedure.

Another procedure that has been employed in the preparation of the formaldehyde-polymethylol urea reactants of the invention is that of U.S. Re. 23,174 which comprises reacting an aqueous formaldehyde solution with urea at a pH of from 7 to 9 in a proportion of urea of from 1 to 4.5 moles formaldehyde per mole of urea at a temperature of from 70 to 90° C., the formaldehyde solution being formed from gaseous formaldehyde and water and retained at a temperature above 45° C. until contacted with the urea. The urea reactant can be utilized as a dry solid although it can be advantageously used in aqueous solution in a concentration in the order of from, say, 85 to 90 percent.

The process of this invention, in the utilization of liquid formaldehyde polymethylol urea above described as the formaldehyde (with urea) reactant, provides product characterized by a water content markedly lower tha would have been possible, i.e., without a separate dryin step, had an aqueous formaldehyde reactant been err ployed in accordance with prior art procedures. Howeve as illustrated herein, the mere utilization of a liquid forn aldehyde polymethylol urea reactant to provide a corre spondingly high solids product does not in itself provic for product of high stability. Stability of the product accomplished only when the said formaldehyde pol methylol urea reactant is reacted under the combinatic of high pH and high temperature conditions above d scribed.

When referring herein to stability of liquid product c the invention, it is meant stability such that when the said product is stored at ambient temperatures, say in the order of 20 to 30° C., the entire solids content is retained in solution, or as an emulsion or finely divided suspension, as the case may be, i.e., without settling or precipitation of water insolubles, over prolonged periods. These stable condensates, therefore, remain as solutions, emulsions or suspensions of fine particles over extended periods without precipitation or settling. Any product capable of retaining its entire solids content in "solution," i.e., without settling, is stable within the meaning of the term used herein. Stability to this degree is in marked contrast to that of low formaldehyde type condensates (U:F >1) made heretofore under lower temperature and pH conditions utilizing aqueous formaldehyde as the formaldehyde reactant.

The invention is illustrated with reference to the following examples.

*Example 1*

140 grams of urea and 26 grams of water were admixed and then heated to 93° C. 100 grams of liquid formaldehyde polymethylol urea having an initial composition weight basis of 26 percent urea, 59 percent formaldehyde and 15 percent water, and 4.0 ml. of 50 percent sodium hydroxide were admixed and then added slowly with agitation over a 10-minute period to the above described urea-water solution. The resulting mixture was then heated at 90° C. for 10 minutes, during which time the pH was 11.4. The pH was then reduced to 8.6 by the addition of 25 percent phosphoric acid and the product cooled. The product was opaque and of a syrupy consistency and was shown by analysis, weight basis, to have been formed from 61.9 percent urea, 22.0 percent formaldehyde and 16.1 percent water (U/F, 1.4:1). The methylol content was 12.2 weight percent, and the free urea content was 19.4 weight percent. The product showed no sign of instability during the following month.

This example demonstrates formation of a stable liquid product in accordance with the basic process concept of the invention, namely, the under concurrent conditions of pH and temperature within the respective ranges of 10.4 to 12 and 90 to 110° C., a formaldehyde polymethylol urea (U:F>1) can be reacted with urea to form a liquid urea-formaldehyde product, containing urea to formaldehyde in a mole ratio greater than 1, which is characterized by a high solids content and is stable over prolonged periods.

*Example 2*

100 grams of a formaldehyde polymethylol urea condensate having an initial composition, weight basis, of 26 percent urea, 59 percent formaldehyde and 15 percent water was admixed with 33 grams of urea and the resulting mixture was then heated with agitation to 103° C. The pH of the resulting mixture was adjusted to 11.2 by the addition of 50 percent sodium hydroxide, and the temperature increased to 106° C. The resulting reaction mixture was then cooled to 95° C. and maintained under those conditions for a 15-minute period. 106 grams of urea and 19.8 grams of water were then added with a concurrent drop in reaction solution temperature. The resulting mixture was then heated for 20 minutes at 68° C. during which time the pH decreased to 10.8, which was then further reduced to 8.6 by the addition of 25 percent phosphoric acid after which the product was cooled to room temperature. The resulting product was a very low viscosity clear solution. No change in the stability of the said product was observed for 3 to 5 days after which time increasing cloudiness occurred until after about one month settling of insolubles began. The product was shown by analysis to have been formed, weight basis, from 22 percent formaldehyde, 62.6 percent urea and 15.2 percent water. The methylol content (weight basis) was 8.8 percent and the free urea content was 24.2 percent.

The final urea:formaldehyde mole ratio of the product was 1.4:1.

This example, as Example 1, demonstrates formation of stable product in accordance with the basic process concept of the invention but differs from Example 1 in that the process is carried out in two steps: (1) reacting the formaldehyde polymethylol urea with a portion of the total urea reactant and (2) then reacting the resulting product with the remainder of the urea reactant. Conducting the reaction in this manner provides for extending the overall reaction time over a broader range to provide increased accuracy of control of the process conditions and yields an initially clear product.

*Example 3*

100 grams of a formaldehyde polymethylol urea reactant of Example 2 and 10.5 grams of water and 60 grams of urea were mixed and heated with agitation at 104° C., the pH of the resulting reaction mixture being 6.0. The pH was then adjusted to 10.9 by adding 50 percent sodium hydroxide. The resulting reaction mixture was then heated at 101° C. for 7 minutes, after which the product began to thicken rapidly. 79 grams urea and 15 grams water were then added followed by heating the resulting mixture for 20 minutes at 68° C., the pH being 10.2 at the end of that period. The pH of the resulting opaque liquid product was adjusted to 8.6 for purpose of storage.

The product had a urea to formaldehyde mole ratio of 1.37:1 and was fairly viscous but did not show any decrease in stability after 6 months' storage at 20 to 30° C., and it was found to contain (weight basis) 22.7 percent combined formaldehyde, 62.0 percent total (free and combined) urea and 15.3 percent water. Analysis showed 3.0 percent methylol and 25.2 percent free urea—all percentages being on a weight basis.

This example illustrates the procedure of Example 2 except that a higher mole ratio of urea to formaldehyde is employed in the first stage of the reaction, i.e., 0.7:1 as compared with 0.38:1 of Example 2. This higher ratio of urea to formaldehyde has provided for a marked extension of product stability as indicated by a comparison of Examples 2 and 3.

*Example 4*

372 pounds of the formaldehyde polymethylol urea condensate reactant of Example 2, 75 pounds of urea and 6100 ml. of water were charged to a 1000-gallon reactor fitted with an anchor type agitator. This resulting reaction mixture was heated up to 105° C. over a 70-minute period after which 3740 ml. of 50 percent NaOH was added over an 8-minute period to bring the pH to 10.6. The reaction temperature was reduced from 94 to 80° C. over a 15-minute period after which the pH was 10.3.

6200 ml. of 42 percent aqueous $H_3PO_4$ was then added to the admixture over a 10-minute period during which time the temperature dropped from 80 to 73° C. The resultant pH was 4.2. Acid condensation then took place, which was continued for 10 minutes at 80° C. after which 442 pounds urea and 78.5 pounds water were added. The reaction was then continued for 15 minutes at 70 to 80° C. after which the pH was adjusted to 8.6 by the addition of 3875 ml. of 50 percent NaOH. Analysis showed the product to have been formed, weight basis, from 21.8 percent formaldehyde, 59.0 percent urea and 19.2 percent water. 7.6 weight percent formaldehyde was present as $CH_2OH$ with 16.5 weight percent urea. The mole ratio of urea to formaldehyde, in the product, was 1.35:1.

The resulting liquid product condensate was a low viscosity (150 cps. at 25° C.) fluid having a specific gravity of 1.30 at 25° C. After two months' storage the product had thickened somewhat due to the thixotropic effect but agitation gave a free flowing liquid, free from any settled material. The material was stable after 4.5 months' storage at ordinary temperatures.

This example demonstrates the high pH and high temperature conditions of the invention utilized in conjunction with a subsequent acid condensation step to provide a final high solids, low formaldehyde (U:F >1) product of low methylol content with a corresponding increase in methylene linkages. The product, by additional acid treatment, is further characterized by solubility properties making it especially suitable as a fertilizer either per se or as a binder for fertilizer ingredients to be slowly released as the composition becomes soluble in the soil.

Example 5

100 grams of a formaldehyde polymethylol condensate reactant of Example 1 was admixed with 3.6 grams of water and 21 grams urea (U:F mole ratio=0.38:1) and heated over a 5-minute period to 95° C., the pH dropping during that time from about 7 to about 6.4. The pH of the resulting reaction mixture was then adjusted to 10.6 by the addition of about 1.7 ml. of 50 per cent NaOH. The temperature of the resulting exothermic condensation reaction mixture rose to 100° C. The condensation was then continued for 15 minutes during which time the temperature was reduced to 95° C. The mixture was then cooled to 80° C. during which time the pH dropped to 9.2. The pH was then brought to 4.5 by adding about 2.2 ml. of 42 percent $H_3PO_4$, and the acid condensation was continued at 80° C. for 20 minutes.

119 grams urea and 22 grams of water were then added and the final reaction step continued for 20 minutes at 80 C. The final pH was 5.6, and it was subsequently adjusted to 8.6 for storage. The warm liquid product was a clear solution which turned slightly cloudy on cooling, but it was stable for about 3 months as manifested by lack of precipitation of insoluble materials. The product (weight basis) was found to have been formed from 22.6 percent formaldehyde, 62.0 percent urea and 15.4 percent water, with a methylol content of 6.0 percent and 25.5 percent free urea, the final product containing urea in a mole ratio to formaldehyde of 1.4:1.

This example is similar to Example 4 except for the difference in scale of operation, and it demonstrates that a marked difference in time can be tolerated at the high pH and high temperature conditions of the invention without appreciably affecting the product characteristics.

Example 6

100 grams of formaldehyde polymethylol urea reactant of Example 1 was admixed with 22 grams of water and heated with agitation to 15 C. 33 grams of urea was then added to provide a resulting admixture containing urea in a mole ratio to formaldehyde of 0.5:1 and the resulting mixture was then heated to 60 to 65 C. for 5 minutes. The pH of the resulting clear reaction mixture was adjusted to 10.5 and heated for 5 minutes at 60 to 65 C. becoming a solid at the end of that period. The solid did not dissolve upon being heated at 100° C. Under these conditions the main reaction appears to have been the formation of difficulty soluble methylol ureas which separated out.

This example demonstrates the need for both high pH and high temperature conditions of the invention in forming high solids product stable over prolonged periods.

Example 7

Example 6 was repeated except that the pH was adjusted to 10.3 instead of 10.5 and the temperature was immediately raised and held at 90 to 100° C. Insoluble material began to separate from the reaction mixture after 8 minutes.

This example demonstrates the criticality of the applicants' minimum pH and temperature conditions. Thus, even under the high temperature conditions employed, the pH was below the minimum of 10.4 with the formation of a resulting unstable solution.

It appears that the basic reaction mechanism involved in the practice of the invention is that of the formation of methylol ureas, predominantly those which under the alkaline pH and temperature conditions employed are of sufficiently low reactivity that they do not continue to react to form insolubles at an appreciable rate and further, that they exhibit an overall solubility in the reaction mixture sufficiently high to be retained in solution over a broad range of urea to formaldehyde ratios in the product.

The liquid product of the invention, characterized by a high methylol content and particularly suitable for further reaction to form solid products for agronomical uses are also conveniently reactable, even after prolonged storage, with more formaldehyde for reaction to form resinous adhesives and molding powders. The product thereby constitute a urea-formaldehyde condensate which can be manufactured for storage over prolonged periods without commitment as to the use that is to be made of it or as to the time that it is to be used.

The liquid product of the invention, which differs from those (U:F >1) heretofore in respect of stability and solids content, i.e., those formed utilizing aqueous formaldehyde as the formaldehyde reactant, obviously differ also in chemical structure although in view of the complexities of structure of these materials, the exact differences are not clearly understood. However, it is probable that in the product of the invention there are oxymethylene linkages, i.e., ether type linkages, between methylol groups that are not present in those liquid compositions in the art.

The following examples further illustrate versatility of the product of this invention.

Example 8

The pH of 50 grams of liquid product prepared in accordance with the procedure of Example 5 was adjusted to 3.0, heated for 1.5 hours at 110° C. and air dried. The resulting white solid urea-form product was found to have an activity index of 60 as measured by the A.O.A.C. (Association of Official Agricultural Chemists) method. Values greater than 40 are preferred for fertilizer use.

Example 9

500 grams 5–10–10 weight percent (N, $P_2O_5$, $K_2O$—balance inerts) finely ground mixed fertilizer is admixed in a laboratory granulator with 200 grams vermiculite which has been passed through a 16-mesh screen. 254 grams of a liquid product prepared in accordance with the procedure of Example 5 is acidified to a pH of 2.5 using 85 percent $H_3PO_4$, and added to the granulator. To achieve better granulation, 140 ml. of water is added. When a satisfactory state of granulation is reached, the material is dried in a rotary drum drier for about 1 hour at 70 to 100° C. This granulated product has an activity index (A.O.A.C. method) of 42.

Example 10

20 grams of liquid product prepared in accordance with the procedure of Example 5 was mixed with 50 ml. water and acidified to pH 4.0 using 42 percent $H_3PO_4$, and was then uniformly mixed with 30 grams No. 4 vermiculate. After further reaction and drying for 16 hours at 50° C., the resultant solid product was found to have an activity index of 85 (A.O.A.C. method).

Example 11

87 grams of a liquid product prepared in accordance with the procedure of Example 5 was admixed with 116 grams 37 percent aqueous formaldehyde and 18.5 grams water, and the pH of the resulting mixture was adjusted to 8.7. The mixture was then refluxed at 100° C. for 10 minutes and cooled to 87° C. The pH was then adjusted to 3.8 after which the mixture was refluxed at 101° C. for 3 hours at a pH of 3.8 to 4.5, the viscosity increasing from 100 cps. to 1800 cps. at 25° C. This viscosity increase under these conditions is typical of the usual resins prepared from urea and aqueous formaldehyde.

*Example 12*

25 grams of stable, liquid high urea condensate product of this invention containing (weight basis) 23 percent combined formaldehyde, 57 percent urea (free and combined) and 20 percent water was mixed with 5.0 grams water and 40 grams of a formaldehyde polymethylol urea concentrate containing 59 percent formaldehyde (free and combined), 26 percent combined urea, and 15 percent water (weight basis) and the pH of the resulting mixture was adjusted to 4.0 with 25 percent $H_3PO_4$. The resulting resin mixture was allowed to react at 25° C. for 15 hours after which it was thick and viscous. A thin layer of resin was applied between two thin pieces of wood. The wood and resin were heated for 2 hours at 110 to 130° C., after which time the two pieces of wood were securely glued together.

As demonstrated with reference to the examples herein, the invention can be practiced in accordance with various process embodiments, it being important that the above described pH and temperature conditions be employed concurrently in all instances. Thus, (1) the ingredients can be admixed and reacted in a single reaction step as illustrated with reference to Example 1; (2) the formaldehyde-polymethylol urea reactant can be reacted with a portion of the urea under the high pH and high temperature conditions of the invention followed by introduction of the remainder of the urea reactant into the system for completion of the reaction as illustrated with reference to Examples 2 and 3; (3) the formaldehyde-polymethylol urea reactant can be reacted with a portion of the urea under the high pH and high temperature conditions of the invention followed by reaction of the remaining portion of the urea reactant under acid pH conditions to produce a highly stable condensate having a high methylene content (as illustrated with reference to Example 4, and with minor modification to Example 5) and particularly suitable for agronomical uses as an urea-form type fertilizer when further acid treated.

In carrying out the above single step embodiment, the liquid formaldehyde polymethylol reactant (F:U>1), and the urea reactant, are admixed in their predetermined proportions for forming total product containing urea to formaldehyde in a mole ratio of from 1:1 to 2:1. The urea is added as a dry solid or as an aqueous solution, say of 85 to 90 percent urea content. The formaldehyde-polymethylol urea reactant is characterized, in all embodiments, by a solids content of at least 65 percent, more often 80 to 85 percent, contains formaldehyde in a mole ratio to urea greater than 1 and usually in the range of from about 1:1 to 7:1 and generally has a methylol content of from about 30 to 70 weight percent. A suitable alkaline material, for example, 50 percent sodium hydroxide, potassium hydroxide or the like is then added to the resulting admixture to bring the pH to within the range of 10.4 to 12, preferably about 10.8 to 11.4 and the resulting high alkaline pH mixture is then heated at a temperature within the range of 90 to 110° C. preferably from about 92 to 98° C. The reaction mixture, preferably with agitation, is then maintained under those pH and temperature conditions for a period up to about 30 minutes, preferably from 10 to 20 minutes. The total reaction mixture at the end of the above said time period is a high solids content, stable product containing urea and formaldehyde in the relative mole ratios above described.

In carrying out the embodiment wherein urea is reacted in two stages, the initial formaldehyde polymethylol urea-urea mixture contains from about 10 to 50 percent of the total urea reactant, to provide a urea to formaldehyde mole ratio within a preferred range of from about 0.3:1 to 0.8:1. A suitable basic material, such as an aqueous 50 percent alkali metal hydroxide, ammonium hydroxide, gaseous ammonia, aqueous sodium carbonate, or the like, is then introduced into the admixture to adjust the pH to within the 10.4 to 12 range, the preferred range being about 10.6 to 11.5. The admixture is then heated to a temperature within the above described range of 90 to 110° C. preferably at a temperature of from about 95 to 100° C. and the reactants then being maintained under the preferred pH and temperature conditions for a period up to about 30 minutes, preferably 10 to 20 minutes.

The remainder of the urea reactant is then added to the reaction mixture subsequent to which it is no longer required that the pH and temperature conditions be maintained within the respective ranges of 10.4 to 12 and 90 to 110° C., a suitable pH during this stage being from 9 to 11 preferably about 10 and a suitable temperature being 50 to 100° C., preferably 65 to 80° C. Reaction time for this second stage is generally from 5 to 50 minutes preferably 10 to 20 minutes. This embodiment is particularly advantageous inasmuch as it affords a more accurate control of urea addition and reaction by providing separate reaction for individual portions of the urea.

In preparation of a product of this invention utilizing both the alkaline and acid treatments, the foregoing embodiment can be carried out in the preparation of the stable liquid product of alkaline condensation. Thus, the initial formaldehyde polymethylol urea-urea reaction mixture contains from about 10 to 50 weight percent of the total urea reactant to provide a urea/formaldehyde mole ratio of from about 0.3:1 to 0.8:1, the overall relative proportions of reactants (i.e., for both steps) being the same as those of the above described single step embodiment. The temperature, time and pH conditions are, as in the foregoing embodiment, respectively, 90 to 110° C. preferably 95 to 100° C., for a period up to about 30 minutes preferably 10 to 20 minutes and a pH of from 10.4 to 12 preferably 10.6 to 11.5. The said product of alkaline condensation, in accordance with this embodiment, is then subjected to acid condensation, which is carried out by adjusting the pH of the resulting reaction mixture to a level in the range of 2 to 5.5, more preferably 4 to 4.5 and then heating at a temperature of from 50 to 100° C. preferably at 70 to 85° C. for a period of from 5 to 60 minutes preferably from 10 to 20 minutes. Additional urea, solid or highly concentrated aqueous solution is then added to the product to provide a resulting reaction mixture containing urea in a mole ratio to formaldehyde within the range of 1:1 to 2:1. The resulting admixture is then maintained under temperature conditions of the initial acid condensation, more preferably at about 65 to 80° C., but at a somewhat higher acid pH generally from about 4.5 to 5.5 for about the same time, and for from 5 to 60 minutes more preferably in the order of from about 10 to 20 minutes. The resulting product is particularly suitable for conversion to urea-form type fertilizers by further heating under acid conditions.

The liquid product in all embodiments is characterized by a stability up to six months and longer and has a minimum solids content in the order of 75 percent and a solids content varying from that minimum on up to a maximum in the order of about 85 to 90 percent. It is generally characterized by a methylol content in the range of from about 3 to 20 percent.

Time conditions for maintaining the reaction mixture under the critical pH and temperature conditions, i.e., pH of 10.4 to 12 and 90 to 110° C., are not critical. Thus, once the said critical pH and temperature conditions are established, the required time can, in some instances apparently be a matter of only a few seconds. However, reaction time prolonged beyond such a short period, e.g., up to about 1 hour, does not appreciably affect the nature of the final condensate product. Generally, from the standpoint of practicability, the period is not extended beyond about 30 minutes, a minimum of 3 minutes being advantageously utilized in many instances.

As illustrated with reference to the examples, the pH of the liquid condensate product of the invention, to assure product stability, is necessarily on the alkaline side, most advantageously in the range of from about 7.5 to 9 preferably 8.0 to 8.5. Accordingly, when the pH of the final reaction mixture product, of the process, is on the acid side, it is necessarily adjusted to a value on the alkaline side preferably within the above said range of 7.5 to 9. If the pH of the final reaction mixture product is on the alkaline side, and outside the said 7.5 to 9 range, it is most advantageously adjusted to a value within that range.

As will be evident to those skilled in the art, various modifications can be made or followed, in the light of the foregoing disclosure and discussion, without departing from the spirit or scope of the disclosure or from the scope of the claims.

What I claim and desire to protect by Letters Patent is:

1. In a process for the preparation of a liquid urea-formaldehyde condensate containing urea in a mole ratio to formaldehyde greater than 1, the improvement providing for an increased stability and solids content of said condensate, comprising admixing an aqueous formaldehyde polymethylol urea condensate containing formaldehyde in a mole ratio to urea greater than 1 and characterized by a solids content of at least 65 percent, with urea in an amount to provide a resulting admixture containing urea to formaldehyde in a mole ratio greater than 1, and maintaining the said admixture while containing at least an initial portion of the said urea at a temperature within the range of from 90 to 110° C. and at a pH of from 10.4 to 12 for a period sufficient to form said condensate.

2. A process of claim 1 wherein the total formaldehyde polymethylol urea and urea reactants are admixed concurrently and then reacted in a single step to form said product.

3. A process of claim 2 wherein the said reactants are reacted at a pH of from 10.8 to 11.4 for a period up to about 30 minutes, and at a temperature of from 92 to 98° C.

4. A process of claim 1 wherein the formaldehyde polymethylol urea is admixed with from 10 to 50 weight percent of the total urea to be reacted therewith and the resulting urea-containing admixture is then reacted at a temperature within the said range of 90 to 110° C. at a pH within the said range of 10.4 to 12 for a period up to about 30 minutes, wherein for a period of from 5–60 minutes the resulting reaction mixture is then maintained at a pH of from 2 to 5.5 by the addition of an acid thereto and at a temperature of 50 to 100° C., wherein urea is then added to the resulting product in an amount providing a resulting final admixture containing urea to formaldehyde in the range of from 1:1 to 2:1 and wherein the said final admixture is then heated at a temperature in the above said 50 to 100° C. range for a period of from 5 to 60 minutes at a pH of 4.5 to 5.5, and adjusting the pH of the last said admixture to a value on the alkaline side.

5. A process of claim 1 wherein said formaldehyde polymethylol urea is admixed with from 10 to 50 weight percent of the total urea to be reacted therewith, the resulting urea-containing admixture is then reacted at a temperature within the said temperature range of 90 to 110° C. and at a pH within the said range of 10.4 to 12 for a period up to about 30 minutes, and is then admixed with the remaining portion of said urea reactant and reacted therewith at a temperature in the range of from 50 to 100° C. at a pH of from 9 to 11 for a period of from 5 to 50 minutes.

6. A process of claim 4 wherein said formaldehyde polymethylol urea-urea admixture containing the first said urea portion is reacted at a temperature of from 95 to 100° C., a pH of from 10.6 to 11.5 for a period of from 10 to 20 minutes and the resulting admixture is maintained at a pH of from 4 to 4.5 and at a temperature of from 70 to 85° C. for a period of from 10 to 20 minutes and wherein the resulting admixture containing the remaining portion of said urea is maintained at a temperature of from 65 to 80° C. and at a pH of from 4.5 to 5.5 for a period of from 10 to 20 minutes, and adjusting the pH of the last said admixture to a value on the alkaline side.

7. A process of claim 5 wherein said formaldehyde polymethylol urea-urea mixture containing the first said urea portion is reacted at a temperature of from 95 to 100° C. and at a pH of from 10.6 to 11.5 for a period of from 10 to 20 minutes, and wherein the resulting admixture containing the remaining urea reactant portion is maintained at a pH of from 9 to 11 at a temperature of 65 to 80° C. for a period of from 10 to 20 minutes.

8. A process of claim 1 wherein the said formaldehyde polymethylol urea reactant contains formaldehyde in a mole ratio to urea of from 1:1 to about 7:1, and has a methylol content of from 30 to 70 weight percent.

9. A stable high-solids content liquid urea-formaldehyde condensate containing urea in a mole ratio to formaldehyde within the range of from 1:1 to 2:1 and characterized by a solids content of at least about 75 percent, and prepared by admixing an aqueous formaldehyde polymethylol urea condensate containing formaldehyde in a mole ratio to urea greater than 1 and characterized by a solids content of at least 65 percent, with urea in an amount to provide a resulting admixture containing urea to formaldehyde in a mole ratio greater than 1, and concurrently maintaining the said admixture at a temperature within the range of from 90 to 110° C. and at a pH of from 10.4 to 12 for a period up to about one hour.

10. A stable high solids content liquid urea-formaldehyde condensate containing urea in a mole ratio to formaldehyde within the range of from 1:1 to 2:1 and characterized by a solids content of at least about 75 percent, and prepared by reacting an aqueous formaldehyde polymethylol urea condensate containing formaldehyde in a mole ratio to urea greater than 1 and characterized by a solids content of at least 65 percent, with urea in an amount to provide, overall, the above said mole ratio of urea to formaldehyde of from 1:1 to 2:1, by admixing said formaldehyde polymethylol urea with from 10 to 50 weight percent of the urea to be reacted therewith, maintaining the resulting formaldehyde polymethylol urea-urea admixture at a temperature within the range of 90 to 110° C. and at a pH of from 10.4 to 12 for a period up to about one hour, maintaining the last said admixture at a pH of from 2 to 5.5, at a temperature of from 50 to 100° C. for a period of from 5 to 60 minutes by the addition of an acid thereto, adding the remaining portion of said urea to the last said admixture, heating the resulting admixture containing the last said portion of urea at a temperature in the above 50 to 100° C. range for a period of from 5 to 60 minutes and at a pH of from 4.5 to 5.5, and adjusting the pH of the last said admixture to a solution on the alkaline side.

11. A stable high solids content liquid urea-formaldehyde condensate containing urea in a mole ratio to formaldehyde within the range of from 1:1 to 2:1 and characterized by a solids content of at least about 75 percent, and prepared by reacting an aqueous formaldehyde polymethylol urea condensate containing formaldehyde in a mole ratio to urea greater than 1 and characterized by a solids content of at least 65 percent, with urea in an amount to provide, overall, the above said mole ratio of urea to formaldehyde of from 1:1 to 2:1, by admixing said formaldehyde polymethylol urea with from 10 to 50 weight percent of the urea to be reacted therewith, maintaining the resulting formaldehyde polymethylol urea-urea admixture at a temperature within the range of 90 to 110° C. and at a pH of from 10.4 to 12 for a period up to about one hour, then adding the remaining portion of said urea to the last said admixture and heating the resulting admixture containing the last said urea portion at a temperature in the range of from 50 to 100° C. and at a pH of from 9 to 11 for a period of from 5 to 50 minutes.

References Cited by the Examiner

UNITED STATES PATENTS

| | | | |
|---|---|---|---|
| Re. 23,174 | 11/49 | Kvalnes | 260—69 |
| 2,174,535 | 10/39 | Smidth | 260—69 |
| 2,669,551 | 2/54 | Vaughn | 260—69 |
| 2,723,253 | 11/55 | Wandell | 260—69 |
| 2,859,260 | 11/58 | Polansky et al. | 260—69 |
| 2,944,046 | 7/60 | Sellet | 260—69 |

OTHER REFERENCES

Ser. No. 373,053, Honel (A.P.C.), published Apr. 20, 1943.

WILLIAM H. SHORT, *Primary Examiner.*

P. E. MANGAM, *Examiner.*